United States Patent Office 3,008,186
Patented Nov. 14, 1961

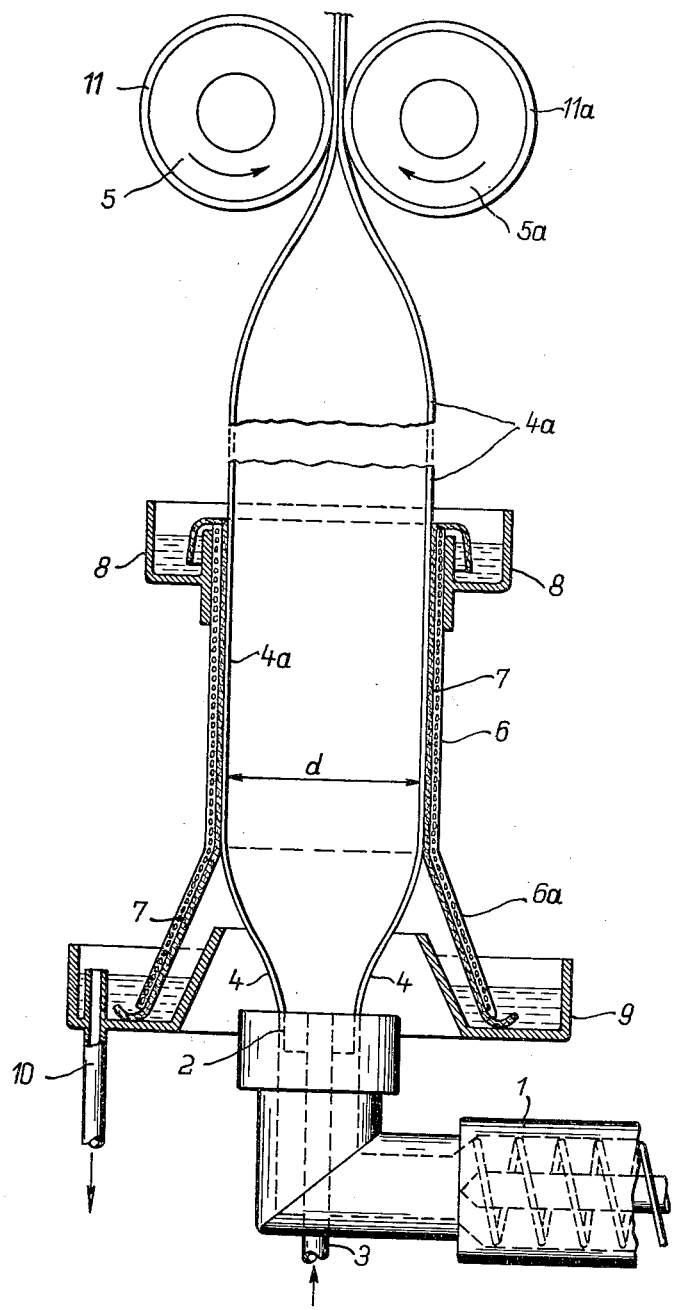

3,008,186
APPARATUS FOR EXTRUDING
THERMOPLASTIC TUBES
Wilfried Voigt, Wiesbaden-Bieberich, Germany, assignor to Lonza Electric and Chemical Works Ltd., Gampel (Wallis), Switzerland
Filed June 19, 1958, Ser. No. 743,162
Claims priority, application Switzerland June 19, 1957
8 Claims. (Cl. 18—14)

This invention relates to the plastic molding of organic thermoplastic materials and more particularly, to the formation of continuous tubular plastic sheet by extrusion and to apparatus therefor.

In the production of light gage thermoplastic tubular shapes, the tubular sheet extruded from an annular shaping orifice is expanded by internal gas pressure and drawn off in continuous operation. Formation of a thin-walled tubular sheet of uniform diameter by this process requires keeping a number of process variables, and particularly the internal gas pressure constant. With sheets of a few thousandths of an inch thickness, this pressure is of the order of magnitude of only 10 mm. water column and difficult to control precisely.

It has now been found that these difficulties can be overcome by entering the inflated tube into a sizing sleeve of novel construction, cooling and solidifying it therein, and drawing it off from there. The final extended diameter of the tube is thus determined by the internal diameter of the sizing sleeve and independent of other process variables.

An object of the present invention is, therefore, the provision of apparatus for sizing a thin-walled thermoplastic extrudate to a perfectly uniform diameter.

Another object is the provision of such a sizing apparatus which is automatic in its operation.

Yet another object of the invention is the provision of apparatus for sizing such thermoplastic extrudates to precise predetermined dimensions.

A further object is to provide means for sizing and cooling the thermoplastic extrudate while protecting it against mechanical damage.

According to a principal feature of the present invention a liquid coolant is passed over the surface of a sizing sleeve arranged for passage of the extrudate therethrough. The coolant is passed over the inside of the sleeve facing the tubular sheet. The coolant is preferably moved over the sleeve surface counter-current to the movement of the tubular sheet which may be drawn from the extrusion guide in the usual manner by a pair of cooperating pressure rolls.

According to another feature of the invention the cooling fluid employed has a boiling point between the softening temperature of the thermoplastic material and the temperature of the extrudate as it enters the sizing sleeve.

According to yet another feature of the invention, coating-forming addition agents such as coloring agents, antistatic agents and the like are added to the cooling liquid so as to form a desired surface coating on the tubular sheet.

In carrying the above-described process into effect, the invention provides for apparatus comprising a sizing sleeve arranged coaxially to the annular shaping orifice of the extruder for restraining the extrudate while it is inflated by gas pressure. The sizing sleeve of the invention is preferably lined on the inside with a tubular wick saturated with the cooling liquid. The end of the wick remote from the shaping orifice of the extruder extends into a supply vessel containing a supply of cooling liquid.

According to a preferred embodiment of the invention the sizing sleeve is provided with perforations and it is contemplated to form at least a portion of the sizing sleeve from wire netting or the like.

It is also preferred conically to expand one end of the sizing sleeve and to arrange the sizing sleeve so as to envelop the shaping orifice of the extruder by the free edge of the conically expanded end of the sleeve.

According to another feature of the present invention the sizing sleeve is arranged vertically and both the upper and the lower end of the wick extend into respective annular vessels, one of said vessels serving for supply of the cooling liquid to the wick, and the other vessel as a recipient for cooling liquid which has passed through the wick.

Other features and many of the attendant advantages of this invention will be readily appreciated as the same becomes better understood by reference to the following detailed description when considered in connection with the accompanying drawing, in which:

The sole figure shows an axial elevational section of a preferred embodiment of an extruder head equipped with the coordinated sizing and take-off equipment of the invention.

Referring to the drawing, there is shown the delivery end of an extruder including a screw press 1 forcing thermoplastic heated material through a heated die having an annular shaping orifice 2 for vertically upward extrusion of a tubular extrudate 4. A conduit 3 passes axially through the extrusion mandrel for the injection of air under pressure into the tubular sheet 4 which is continuously extruded from shaping orifice 2. The hot sheet emerging from the extruder is still soft and moldable. It is expanded by the pressure of the air or other gas supplied through conduit 3 as an internal support for the extruded tube. The inflated and expanded extrudate is flattened between pinch rolls 5 and 5a externally coated with layers of resilient material 11, 11a which thereby form a substantially gastight seal between the superimposed layers of solidified tube 4a, and permit a constant gas pressure to be maintained in the cavity formed by the extruded tube.

A sizing sleeve 6 having a cylindrical upper portion is arranged between the extruder head and the pinch rolls coaxially with the annular shaping orifice 2. An aqueous cooling liquid is passed downward over the inner wall of the sleeve 6. The cooling liquid thus passes over the sleeve surface countercurrent to the direction of travel of the extrudate 4. In order to obtain maximum cooling effect, the sleeve 6 is made of wire screen or netting and is covered on the inside with a tubular wick 7 for uniform distribution of the coolant over the interior surface of sleeve 6. The upper end 7 extending beyond the edge of sleeve 6 is folded over and enters an annular vessel 8 arranged coaxially about the top edge of the sleeve. The annular vessel 8 is filled with a coolant which is taken up by the capillary action of the wick and passed downward by gravity over the surface of the sleeve 6. The lower portion 6a of the sleeve 6 is expanded conically and the wick is equally cone-shaped in its lower portion. It extends beyond the lower edge of sleeve 6 and dips into a second annular vessel 9. The liquid passing from supply vessel 9 through the wick 7, as far as it is not lost by evaporation or carried away by tubular film 4a, is collected in vessel 9 and discharged through an overflow pipe 10 which maintains a constant liquid level in vessel 9.

The air gap between the shaping orifice 2 and the point of contact of the extrudate 4 with the cylindrical portion of wick 7 is preferably selected so that the external diameter of the inflated tubular extrudate is slightly larger at the contact than the internal diameter $d$ of wick-covered sleeve 6. The conical lower portion 6a of sleeve 6 envelops the shaping orifice 2 of the extruder and thus encloses the air gap between the orifice 2 and the cylindrical portion of sleeve 6. Because of the lack of air circulation, air cooling is held to a minimum and the extruded tube 4 is still heat-moldable as it enters the wick-covered sleeve 6. It is therefore reduced precisely to the predetermined interior diameter $d$ of the wick 7. In the lower portion of the sleeve 6 a vapor film formed by a coolant of properly selected boiling temperature is interposed between the wick surface and the moving film 4 and minimizes frictions. A liquid film acts as a lubricant between the substantially solidified plastic film 4a in the upper regions of sleeve 6. Mechanical damage to the extrudate by sticking or other frictional effects is prevented thereby.

Water is a suitable coolant for the numerous extrudable thermoplastic materials whose softening point is at or somewhat below 212° F. and which include low-temperature polyethylene, polyvinyl chloride, and the cellulose esters. Coloring agents, such as dyes, pigments and suitable carriers, and antistatic agents, such as water-soluble esters of stearic acid which later form an antistatic film on the surface of the extrudate may be added to the cooling liquid.

Cooling liquids other than water may be employed with plastics having a softening temperature above 212° F. and such liquids are preferably selected so as to have a boiling point between the softening temperature of the extruded plastic material and the temperature of the extrudate entering the sizing sleeve 6. If the cost of the evaporated coolant is of economical significance, or if the vapors are obnoxious, the coolant may be recovered from the working area. Where the composition of the coolant may change because of thermal or other effects, valuable constituents may be recovered from the discharged coolant by distillation or other known processes.

The wick 7 is preferably made of knitted textile material, using either natural or synthetic fibers in a preferably seamless structure. A woven wick or one made of felt, however, is suitable for use with the process of the invention and the invention is not limited to any specific wick structure. It will, thus, be apparent to those skilled in the art that a wick of an inorganic material such as asbestos may be used to advantage if conditions so require, and that liquid coolant may be supplied to the wick by means other than those illustrated, for example, by dipping or spraying.

The apparatus of the invention thus provides apparatus for uniformly cooling a thermoplastic tubular extrudate by means of a cooling liquid while imparting to the tube a precise predetermined diameter. The invention furthermore provides auxiliary means for preventing mechanical damage to the extrudate while in the process of solidification and thus especially vulnerable to such mechanical damage.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention set forth in the appended claims.

What is claimed is:

1. In a tube extrusion arrangement, tubular sizing means; means for passing an extruded tube through said sizing means; a liquid-retaining lining arranged along the inner surface of said tubular sizing means; and means for passing cooling fluid along said lining so as to cool said tube during passage through said tubular sizing means whereby said tube during such passage is simultaneously shaped and cooled so as to be transformed into shape retaining shaped condition.

2. In a tube extrusion arrangement, perforated tubular sizing means; means for passing an extruded tube through said sizing means; a liquid-retaining lining arranged along the inner surface of said tubular sizing means; and means for passing cooling fluid through said lining along the inner surface of said tubular sizing means, so as to cool said tube during passage through said tubular sizing means whereby said tube during such passage is simultaneously shaped and cooled so as to be transformed into shape-retaining shaped condition.

3. In an arrangement for extrusion of a tube of thermoplastic material, a tube-extruding orifice, tubular sizing means; means for passing an extruded tube through said sizing means, said sizing means having a radially expanding terminal portion facing and enveloping said orifice; a liquid-retaining lining arranged along the inner surface of said tubular sizing means; and means for passing cooling fluid through said lining along the inner surface of said tubular sizing means, so as to cool said tube during passage through said tubular sizing means whereby said tube during such passage is simultaneously shaped and cooled so as to be transformed into shape-retaining shaped condition.

4. In a tube extrusion arrangement, tubular sizing means; means for passing an extruded tube through said sizing means; a liquid-retaining lining arranged along the inner surface of said tubular sizing means; a liquid-coolant supply container arranged at one end of said tubular sizing means, said lining being liquid absorbent and extending into said container for absorption of said coolant, so as to cool said tube during passage through said tubular sizing means whereby said tube during such passage is simultaneously shaped and cooled so as to be transformed into shape-retaining shaped condition.

5. In a tube extrusion arrangement, tubular sizing means; means for passing an extruded tube through said sizing means; a liquid-retaining lining arranged along the inner surface of said tubular sizing means; a liquid-coolant supply container arranged at the upper end of said tubular sizing means and a liquid-coolant receiving container arranged at the lower end of said tubular sizing means, said lining being liquid absorbent and extending into said containers for absorption and discharge respectively of said coolant, so as to cool said tube during passage through said tubular sizing means whereby said tube during such passage is simultaneously shaped and cooled so as to be transformed into shape-retaining shaped condition.

6. In an arrangement for the extrusion of a tube of themoplastic material; a shaping orifice for substantially upward extrusion of said tube; perforated tubular sizing means axially aligned with said orifice and enveloping said orifice by the lower end thereof; means for passing an extruded tube through said sizing means; a liquid-retaining absorbent lining arranged along the inner surface of said tubular sizing means; and a supply container and a receiving container for liquid coolant arranged at the upper and lower ends respectively of said tubular sizing means, said absorbent lining projecting into said containers for take-up and discharge respectively of cooling liquid so as to cool said tube during passage through said tubular sizing means whereby said tube during such passage is simultaneously shaped and cooled so as to be transformed into shape-retaining shaped condition.

7. In a tubular extrusion arrangement, in combination, vertical tubular sizing means; means for passing an extruded tube upwardly through said sizing means; a liquid-retaining lining arranged along the inner surface of the tubular sizing means for contacting said tube during passage through said sizing means; and means for passing a liquid coolant downwardly through said lining, whereby a said tube during its passage through said sizing means is simultaneously shaped and cooled so as to be transformed into shape-retaining condition.

8. In a tube extrusion arrangement, in combination, means for extruding a tube in hot moldable condition vertically upward from an annular opening; tubular sizing means arranged vertically above and in axial alignment with said opening; means for passing the extruded tube through said sizing means; a liquid-retaining lining arranged along the inner surface of said tubular sizing means; means for passing a liquid coolant downwardly through said lining; and means for maintaining a gas pressure greater than ambient pressure within the extruded tube for expanding the tube into contact with said lining during passing through said sizing means, whereby said tube during its passage through said sizing means is simultaneously shaped and cooled so as to be transformed into shape-retaining condition.

References Cited in the file of this patent

UNITED STATES PATENTS

| | | |
|---|---|---|
| 2,641,022 | Kress | June 9, 1953 |
| 2,732,592 | Tunnicliff et al. | Jan. 31, 1956 |
| 2,852,813 | Longstreth | Sept. 23, 1958 |
| 2,863,172 | Buteux et al. | Dec. 9, 1958 |

FOREIGN PATENTS

| | | |
|---|---|---|
| 1,106,084 | France | July 13, 1955 |